United States Patent [19]

Amano et al.

[11] Patent Number: 5,849,404

[45] Date of Patent: Dec. 15, 1998

[54] SHEET MATERIAL AND PROCESS FOR PRODUCTION THEREOF

[75] Inventors: Satoshi Amano; Takahiko Ito, both of Tokyo, Japan

[73] Assignee: Nisshinbo Industries, Inc., Tokyo, Japan

[21] Appl. No.: 525,562

[22] PCT Filed: Jan. 24, 1995

[86] PCT No.: PCT/JP95/00079

§ 371 Date: Sep. 19, 1995

§ 102(e) Date: Sep. 19, 1995

[87] PCT Pub. No.: WO95/20012

PCT Pub. Date: Jul. 27, 1995

[30] Foreign Application Priority Data

Jan. 25, 1994 [JP] Japan ................................. 6-023629

[51] Int. Cl.$^6$ ................ B32B 5/02; B32B 5/16; C08L 9/00
[52] U.S. Cl. .................. 428/295.1; 428/221; 428/323
[58] Field of Search .................. 428/230, 233, 428/240, 221, 295.1, 323; 524/81, 401

[56] References Cited

U.S. PATENT DOCUMENTS

| | | | |
|---|---|---|---|
| 3,963,801 | 6/1976 | Su | 525/166 |
| 4,548,999 | 10/1985 | Steinberger et al. | 525/453 |
| 4,718,889 | 1/1988 | Blasius, Jr. et al. | 604/1 |
| 4,861,828 | 8/1989 | Waggoner | 525/66 |
| 4,977,218 | 12/1990 | Gardner et al. | 525/329.3 |
| 5,180,631 | 1/1993 | Amano | 428/240 |

FOREIGN PATENT DOCUMENTS

| | | |
|---|---|---|
| 52-123484 A | 10/1977 | Japan . |
| 61-66724 A | 4/1986 | Japan . |
| 61-246245 A | 11/1986 | Japan . |
| 2-175757 A | 7/1990 | Japan . |
| 3-292331 A | 12/1991 | Japan . |
| 4-175366 A | 6/1992 | Japan . |
| 5-186615 A | 7/1993 | Japan . |
| 5-320611 A | 12/1993 | Japan . |

*Primary Examiner*—Tae Yoon
*Attorney, Agent, or Firm*—Kubovcik & Kobovcik

[57] ABSTRACT

The present invention provides a sheet material including at least an inorganic filler other than asbestos, a polycarbodiimide resin, a rubber having a functional group reactive with a carbodiimide group and, as necessary, an organic or inorganic fiber, or such a sheet material wherein the polycarbodiimide resin and the rubber have been reacted with each other at least partially. A process for producing the sheet material includes making into a sheet-shaped material a composition comprising at least an inorganic filler other than asbestos, a polycarbodiimide resin, a rubber having a functional group reactive with a carbodiimide group and, as necessary, an organic or inorganic fiber, and then heating the sheet-shaped material at a temperature not lower than the softening point of said polycarbodiimide resin, or such a process wherein the heating of the sheet-shaped material at said temperature gives rise to at least partial reaction between the polycarbodiimide resin and the rubber. Said sheet material uses no asbestos fiber and yet exhibits excellent flexibility, sealing property, strength, chemical resistance and heat resistance; and can be used as a gasket having excellent resistance particularly to fluorocarbon refrigerants and oils used in the apparatuses using said refrigerants.

15 Claims, No Drawings

SHEET MATERIAL AND PROCESS FOR PRODUCTION THEREOF

TECHNICAL FIELD

The present invention relates to a sheet material as well as to a process for production thereof. More particularly, the present invention relates to a sheet material which exhibits excellent flexibility, sealing property, strength, chemical resistance and heat resistance without using an asbestos fiber and which can be used as a gasket having excellent resistance particularly to fluoro carbon refrigerants and oils used in the apparatuses using said refrigerants; as well as to a process which can produce said sheet material easily, continuously and at a low cost.

BACKGROUND ART

An asbestos sheet is known as a sheet material used in gasket, etc. This asbestos sheet as a conventional sheet material is generally made of asbestos as a base material fiber, a rubber as a binder and a filler in order to have flexibility, sealing property, heat resistance and strength. With respect to asbestos, however, there have arisen in recent years problems such as exhaustion of asbestos resource, resultant difficulty in asbestos procurement, and adverse effect on human health; accordingly, the use of asbestos is under restudy.

Because of the above mentioned problems of asbestos, active researches have been conducted in the sheet material field in order to develop an asbestos sheet substitute by the use of a fibrous basic material other than asbestos. As asbestos substitutes, there have been proposed inorganic fibers such as glass fiber, rock wool, ceramic fiber, carbon fiber and the like, as well as organic fibers such as aramid fiber, polyester fiber, polyacrylonitrile fiber, phenolic resin fiber and the like.

However, none of these inorganic and organic fibers has yet shown fully satisfactory sealing property because their diameters are large as compared with those of asbestos and are disadvantageous to produce a sheet material of dense structure.

In order to overcome the drawback, it was proposed to use a thermoplastic polyolefin fiber or the like and melt bond the fiber to obtain improved sealing property. However, such a fiber generally causes remelting at a temperature of 1800° C. or less and accordingly has insufficient heat resistance.

It was also proposed to increase the addition amount of a rubber to produce a sheet material of improved strength and sealing property. Such a sheet material, however, has low heat resistance and is easy to be flattened. In order to solve these problems, it was proposed to increase the amount of curing (crosslinking) agent for rubber. However, since the curing (crosslinking) agent is composed generally of sulfur or a peroxide, the proposal poses a new problem of metal corrosion and makes the approach of increasing the addition amount of rubber substantially meaningless.

Meanwhile, Japanese Patent Application Kokai (Laid-Open) No. 62814/1991 discloses a polycarbodiimide pulp obtained by converting an organic diisocyanate into a quaternary ammonium salt and then converting the salt into a polycarbodiimide. According to the literature, the polycarbodiimide pulp has heat resistance and can be used as a sheet material. It is feared, however, that the pulp, depending upon the application, generates an amine owing to the partial decomposition of the quaternary ammonium salt contained therein and the amine may pose an odor problem.

Recently, a need has increased for a gasket material which has durability to flon substitutes (these substitutes have come to be used in place of flon which causes the destruction of ozone layer) such as chlorofluorocarbons, hydrochlorofluorocarbons and hydrofluorocarbons, or to oils of polyalkylene glycol type or ester type used in the apparatuses using said refrigerants. Hence, it is desired to develop a sheet material having sufficient durability to said flon substitutes or said oils.

The objects of the present invention are to provide a sheet material which is free from the problems of the prior art, which exhibits excellent flexibility, sealing property, strength, chemical resistance and heat resistance without using an asbestos fiber and which can be used as a gasket having excellent resistance particularly to fluorocarbon refrigerants and oils used in the apparatuses using said refrigerants; as well as a process which can produce said sheet material easily, continuously and at a low cost.

DISCLOSURE OF THE INVENTION

In order to achieve the above objects, the present invention provides:

a sheet material comprising at least an inorganic filler other than asbestos, a polycarbodiimide resin, a rubber having a functional group reactive with a carbodiimide group and, as necessary, an organic or inorganic fiber, or such a sheet material wherein the polycarbodiimide resin and the rubber have been reacted with each other at least partially; and a process for producing a sheet material, which comprises making into a sheet shaped material a composition comprising at least an inorganic filler other than asbestos, a polycarbodiimide resin, a rubber having a functional group reactive with a carbodiimide group and, as necessary, an organic or inorganic fiber, and then heating the sheet shaped material at a temperature not lower than the softening point of said polycarbodiimide resin, or such process wherein the heating of the sheet shaped material at said temperature gives rise to at least partial reaction between the polycarbodiimide resin and the rubber.

Best Mode for Carrying Out the Invention

The present invention is hereinafter described in detail.

The inorganic filler used in the sheet material of the present invention has no particular restriction as long as it is an inorganic filler other than asbestos. Specific examples thereof are fibers such as glass fiber, rock wool, ceramic fiber, sepiolite and the like; powders, flakes or whiskers of clay, talc, barium sulfate, mica, vermiculite, calcium carbonate, silica, wollastonite, magnesium sulfate, potassium titanate, carbon black and the like; and their appropriate mixtures.

The polycarbodiimide resin used in the present invention is known per se, or can be produced by the known processes [reference is made to, for example, U.S. Pat. No. 2,941,956; Japanese Patent Publication No. 33279/1972; J. Org. Chem., 28, 20692075 (1963); and Chemical Review 1981, Vol.81, No.4, 619621]. It can easily be produced, for example, by subjecting an organic diisocyanate to a condensation reaction (wherein carbon dioxide is removed) in the presence of a carbodiimidization catalyst.

The organic diisocyanate used in the production of the polycarbodiimide resin can be any of aliphatic type, alicyclic type, aromatic type, aromatic-aliphatic type, etc. They can be used singly or in admixture of two or more (in the latter case, the polycarbodiimide resin is obtained as a copolymer).

The polycarbodiimide resin used in the present invention includes homopolymers and copolymers containing at least one recurring unit represented by the following formula

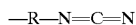

wherein R represents an organic diisocyanate residue.

The above R (organic diisocyanate residue) is preferably an aromatic diisocyanate residue. [Herein, "organic diisocyanate residue" refers to an organic diisocyanate moiety which remains when two isocyanate groups (NCO) are removed from one organic diisocyanate molecule.] Examples of such an organic diisocyanate are those represented by the following formulas (1), (2) and (3).

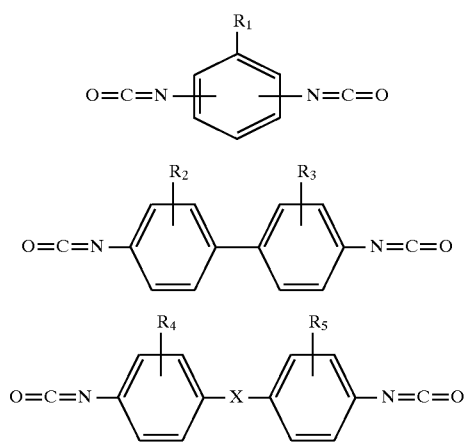

In the above formulas, the substituents $R_1$, $R_2$, $R_3$, $R_4$ and $R_5$ each represent a hydrogen atom, a lower alkyl group such as methyl, ethyl, propyl, butyl or the like, or a lower alkoxy group corresponding to said alkyl group; and the substituent X represents an oxygen atom or a methylene group.

Specific examples of the organic diisocyanate represented by formula (1) include tolylene diisocyanates such as 2,4-tolylene diisocyanate, 2,6-tolylene diisocyanate, a mixture thereof and the like; and 1-methoxyphenyl-2,4-diisocyanate. Specific examples of the organic diisocyanate represented by formula (2) include o-tolidine diisocyanate. Specific examples of the organic diisocyanate represented by formula (3) include 4,4'-diphenylmethane diisocyanate, 4,4'-diphenyl ether diisocyanate and 3,3'-dimethyl-4,4'-diphenylether diisocyanate.

The reaction for converting the organic diisocyanate into a polycarbodiimide resin is conducted in the presence of a carbodiimidization catalyst. The carbodiimidization catalyst includes, for example, phospholene oxides such as 3-methyl-1-phenyl-2-phospholene-1-oxide and the like.

The form of the polycarbodiimide resin used in the present invention can be a powder, a pulp, etc.

The powdery polycarbodiimide resin can be produced from an organic diisocyanate represented by the above formula (1), (2) or (3), for example, by a precipitation polymerization process described in J. Appl. Polym. Sci., 21, 1999 (1997), Japanese Patent Publication No. 16759/1977 or the like, which comprises reacting said organic diisocyanate and an organic monoisocyanate (as a molecular weight regulator) in an inert organic solvent in the presence of a carbodiimidization catalyst to precipitate and isolate a polycarbodiimide resin in a powder form; or by a process described in Japanese Patent Application (Laid-Open) No. 239223/1993, which comprises conducting the above carbodiimidization reaction in a halogen type solvent (a synthetic solvent) to obtain a uniform polycarbodiimide solution, then cooling the solution to convert it into a slurry, and spray-drying the slurry.

Said molecular weight regulator may also be a compound having one functional group such as OH, $NH_2$, COOH, SH, NH-alkyl group or the like; or a derivative of an isocyanate-terminated compound, obtained by reacting the above compound having at least one functional group with an organic diisocyanate so that the reaction product has an isocyanate group at the terminal.

Also, there are processes using no molecular weight regulator, and examples thereof are described in T. W. Campbell et al., J. Org. Chem., 28, 2069 (1963) mentioned above; C. S. Ford et al., Macromol. Syn., 1, 74 (1963); and T. W. Campbell et al., Macromol. Syn., 3, 109 (1963). The powdery polycarbodiimide resins obtained by these processes, however, have a relatively low molecular weight and accordingly contain a large amount of a residual isocyanate. Therefore, this isocyanate, which has a high reactivity, may give adverse effects in the application of the sheet material produced with said powdery polycarbodiimide resin.

In order to solve the problems caused by the residual isocyanate, there can be cited a method for obtaining a powdery polycarbodiimide resin by polymerizing an organic diisocyanate of the above formula (1), (2) or (3) in a monomer concentration of 30% by weight or less, preferably 20% by weight or less in the presence of a carbodiimidization catalyst in an alicyclic ether (a polymerization solvent) to obtain a solution of a stable polycarbodiimide resin having an average polymerization degree of 15 or more, preferably 20 or more, and then precipitating the polycarbodiimide in a poor solvent.

The alicyclic ether used above is preferably a liquid at room temperature and has two or less ether bonds in the molecule. Specific examples thereof are tetrahydrofuran, dioxolane, dioxime, tetrahydropyran and a mixed solvent thereof. Of these, tetrahydrofuran is preferred.

Meanwhile, the pulp-like polycarbodiimide resin usable in the present invention can be obtained, for example, by a method using an organic diisocyanate of the above formula (1), (2) or (3), described in Japanese Patent Application Kokai (Laid-Open) No. 195483/1993. That is, there is produced a solution of a polycarbodiimide resin having an average polymerization degree of 15 or more (when no molecular weight regulator is used) or having an average polymerization degree of 10 or more when a molecular weight regulator is used), using the above-mentioned alicyclic ether as a polymerization solvent; the polycarbodiimide resin solution and a coagulant are discharged, for example, via a nozzle to obtain a pulp-like polycarbodiimide resin.

The rubber used in the present invention must have a functional group reactive with the carbodiimide group of the polycarbodiimide resin. As the "functional group reactive with carbodiimide group" referred to herein, there can be cited the functional groups described in Frederick Kurzer et al., Advances in The Chemistry of Carbodiimide, Vol. 67 (2),1967. Preferable of said functional groups are at least one group selected from carboxyl group, phenolic hydroxyl group, alcoholic hydroxyl group, primary or secondary amino group, epoxy group, thiol group and carboxylic acid anhydride.

As the rubber having the above-mentioned functional group, there can be cited chemically synthesizable rubbers of acrylic type, acrylonitrile-butadiene type, styrene-butadiene type, hydrogenated acrylonitrile-butadiene type, ethylene-acrylic type, polyester-urethane type, polyether-urethane type, chloroprene type, etc.

The rubber is preferably used in the form of an emulsion or a latex. Preferable specific examples of the emulsion or latex are a carboxy-modified styrene-butadiene rubber latex, a carboxy-modified acrylonitrile-butadiene rubber latex and an acrylic resin emulsion all of commercial production.

The feature of the present invention lies in that the polycarbodiimide resin and the rubber having a functional group reactive with the carbodiimide group of the polycarbodiimide are at least partially reacted with each other. When the rubber is in the form of an emulsion or latex, the polycarbodiimide resin (which is a solid) and the emulsion or latex are mixed at room temperature to prepare a sheet material. In this case, substantially no reaction takes place and the mixture can be made into a sheet. When the sheet is subjected to press molding at a temperature not lower than the softening point of the polycarbodiimide resin, said resin and the rubber (having a functional group reactive with the carbodiimide group of the resin) are reacted with each other.

When it is tried to knead the polycarbodiimide resin and a raw rubber having a functional group reactive with the carbodiimide group of the resin, the kneading must be done with cooling to a temperature of, for example, preferably 40° C. or below, more preferably 30° C. or below, because the kneading generates a heat and gives rise to a reaction, reducing moldability and making the resulting material unsuitable for use as a sheet material.

In an alternative method, the surface of the polycarbodiimide resin is coated (the polycarbodiimide resin is encapsulated) with a material inert to the rubber; then, kneading is conducted to obtain a sheet; and heating and a pressure are applied to give rise to a reaction.

Thus, in the composition between a polycarbodiimide resin and a rubber wherein they have been reacted, the low water resistance of the rubber emulsion or latex is improved; the heat resistance and chemical resistance of the rubber is improved; and use of sulfur, peroxide or the like as curing (crosslinking) agent (they cause corrosion of metal) is not necessary because the polycarbodiimide resin acts as a crosslinking agent for the rubber (that is, the present invention provides a novel curing method for rubber). Therefore, in the present invention, use of an increased amount of a rubber (this has been impossible in the conventional process for production of sheet material) is possible without inviting flattening or corrosion of metal, and a sheet material having excellent heat resistance and chemical resistance can be produced.

In the present sheet material having the above features, the polycarbodiimide resin and the rubber form the following structure by an addition reaction when the functional group of the rubber reactive with a carbodiimide group is, for example, a carboxyl group.

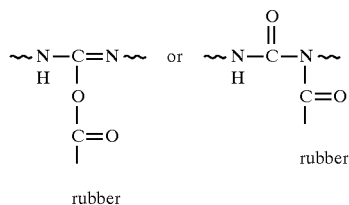

(A similar addition reaction takes place when said functional group is a phenolic hydroxyl group, an alcoholic hydroxyl group, an amino group or a thiol group.) The polycarbodiimide resin and the rubber form the following structure by a cyclization reaction when the functional group of the rubber reactive with a carbodiimide group is an acid anhydride.

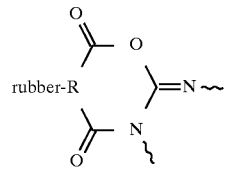

(A similar cyclization reaction takes place when said functional group is an epoxy group.)

The present sheet material may comprise, in addition to the above-mentioned components, an appropriate fiber as necessary. The fiber includes an organic fiber and an inorganic fiber. Specific examples of the fiber are a polyamide fiber, an aramid fiber, a polyester fiber, a polyacrylonitrile fiber, pulps thereof, celluloses (e.g. cotton, hemp, pulp), a glass fiber, a rock wool, a ceramic fiber and a carbon fiber. Preferable of these are an aramid fiber, its pulp, a glass fiber and a carbon fiber when a strength is required.

The present sheet material may further comprise, as necessary, a rubber having no functional group reactive with a carbodiimide group, in an amount not giving an adverse effect on the properties of the sheet. Such a rubber can be exemplified by nitrile rubbers (NBR, hydrogenated NBR), styrene-butadiene rubber (SBR), isoprene rubber (IR), chloroprene-rubber (CR), butadiene rubber (BR), butyl rubber (IIR), ethylene-propylene rubber (EPM), ethylene-vinylacetate rubber (EVA), chlorinated polyethylene rubber (CPE), epichlorohydrin rubber (ECO), nitrile-isoprene rubber (NIR), fluoro rubber(FRM), silicone rubber (Si), natural rubber (NR) and latexes thereof.

The proportions of the individual components mentioned above can appropriately be determined depending upon the application purposes and conditions of the present sheet, but are as follows, for example,

| | |
|---|---|
| Inorganic filler other than asbestos | 30–90% by weight |
| Rubber having a functional group reactive with a carbodiimide group | 5–50% by weight |
| Polycarbodiimide resin | 1–50% by weight |
| Fiber | 0–50% by weight |
| Rubber having no functional group reactive with a carbodiimide group | 0–30% by weight |

Depending upon the application of the present sheet, the polycarbodiimide resin is preferably used in an amount equal to or smaller than the amount of the rubber having a functional group reactive with a carbodiimide group. It is possible to further use an appropriate amount of a known curing (crosslinking) agent for rubber.

The present sheet having the above-mentioned features can be obtained by the present process which comprises making into a sheet-shaped material a composition comprising an inorganic filler other than asbestos, a polycarbodiimide resin, a rubber having a functional group reactive with a carbodiimide group, an organic or inorganic fiber added as necessary and a rubber having no functional group reactive with a carbodiimide group, added as necessary, and then heating the sheet-shaped material at a temperature not lower than the softening point of the polycarbodiimide resin.

The mixing of individual components, sheeting of mixture and molding of sheet-shaped material can each be conducted by a known means. For example, the sheeting can be conducted by a beater method; and the molding of sheet-shaped material can be conducted by press molding or roll molding. The heating temperature is, for example, 150°–300° C. The sheet-shaped material obtained can be laminated during the molding.

The present invention is hereinafter described in more detail by way of Examples.

EXAMPLE 1

(1) Production of polycarbodiimide resin pulp A four-necked flask was provided with a Dimroth condenser, a thermometer and a mechanical stirrer. From the material inlet of the flask was added 4,000 ml of tetrahydrofuran. Then, 650 g of MDI (4,4'-diphenylmethane diisocyanate) as a material was added, followed by addition of 0.2% by weight, based on MDI, of 3-methyl-1-phenyl-2-phospholene-1-oxide. A reaction was conducted under refluxing for 7 hours to obtain a dope of a polycarbodiimide resin. The concentration of the monomer used was 15.5%; the content of NCO in the dope was 1.0%; and the average polymerization degree was n=40.

The dope was placed in an autoclave. The autoclave was connected with a nozzle (a two-fluid nozzle manufactured by Spraying System Co.) and a compressor, and the dope was discharged by the use of a back pressure. By controlling the back pressure, the dope and a coagulant were discharged from the two-fluid nozzle into a coagulation bath at rates of 10 ml/min and 1,010 ml/min, respectively, whereby the polycarbodiimide in the dope was made into a pulp. The pulp was collected by filtration and dried to obtain an intended pulp. An intended pulp was obtained also when no coagulation bath was used.

(2) Production of sheet material

| Above polycarbodiimide resin pulp | 15% by weight |
|---|---|
| Rubber (carboxy-modified NBR latex) | 23% by weight (as solid) |
| Aramid pulp (fiber) | 10% by weight |
| Inorganic filler | 52% by weight |

A composition having the above formulation was prepared by mixing and made into a sheet-shaped material. The sheet-shaped material was molded at 200° C. at 200 kg/cm² for 10 minutes to obtain a sheet material of 0.5 mm in thickness. The sheet material was measured for tensile strength, sealing property, and resistances to flons and refrigeration oils. The results are shown in Table 1.

"Sealing property" was expressed by a pressure of introduced nitrogen gas when a gasket of desired shape was stamped from the above-obtained sheet material, the gasket was inserted between two flanges, the flanges were clamped at a surface pressure of 100 kg/cm², the outlet side of the flanges was sealed, nitrogen gas was introduced from the inlet side to increase the internal pressure, and the rate of nitrogen gas leaking from the flanges reached 5 ml/min. "Resistances to flons and refrigeration oils" were each expressed by a retention of tensile strength after immersion of the above-mentioned sheet material in a flon at 70° C. for 24 hours or in a refrigeration oil at 150° C. for 5 hours, measured by JIS R 3453.

EXAMPLE 2

(1) Production of polycarbodiimide resin powder 750 g of MDI (4,4'-diphenylmethane diisocyanate) and 71.4 g of phenyl isocyanate were reacted together with 1.5 g of a carbodiimidization catalyst (3-methyl-1-phenyl-2-phospholene-1-oxide) in 2,458 g of tetrachloroethylene at 120° C. for 4 hours to obtain a light yellow transparent polycarbodiimide resin solution (resin concentration=20%).

The solution was cooled to 40° C. in 12 hours to obtain a polycarbodiimide slurry having a viscosity of 270 cp. The polycarbodiimide resin slurry was spray-dried at a temperature of 60° C. at an air pressure of 2 kg/cm² at a slurry feeding rate of 1 liter/hour to obtain a light yellow polycarbodiimide resin powder having an average polymerization degree of n=10.

(2) Production of sheet material

| Polycarbodiimide resin powder | 5% by weight |
|---|---|
| Polycarbodiimide resin pulp obtained in Example 1 | 10% by weight |
| Rubber (carboxy-modified NBR latex) | 20% by weight (as solid) |
| Aramid pulp (fiber) | 10% by weight |
| Inorganic filler | 55% by weight |

A composition having the above formulation was prepared by mixing and made into a sheet-shaped material. The sheet-shaped material was molded at 180° C. at 200 kg/cm² for 10 minutes to obtain a sheet material of 0.5 mm in thickness. The sheet material was measured for tensile strength, sealing property, and resistances to flons and refrigeration oils, in the same manners as in Example 1. The results are shown in Table 1.

EXAMPLE 3

| Polycarbodiimide resin powder obtained in Example 2 | 10% by weight |
|---|---|
| Rubber (carboxy-modified NBR latex) | 15% by weight (as solid) |
| Aramid pulp (fiber) | 12% by weight |
| Inorganic filler | 63% by weight |

A composition having the above formulation was prepared by mixing and made into a sheet-shaped material. The sheet-shaped material was passed through rolls twice at 220° C. at a line pressure of 300 kg/cm to obtain a sheet material of 0.8 mm in thickness. The sheet material was measured for tensile strength, sealing property, and resistances to flons and refrigeration oils, in the same manners as in Example 1. The results are shown in Table 1.

EXAMPLE 4

| Polycarbodiimide resin pulp obtained in Example 1 | 20% by weight |
|---|---|
| Rubber (carboxy-modified acrylic resin emulsion) | 18% by weight (as solid) |
| Aramid pulp (fiber) | 8% by weight |
| Inorganic filler | 54% by weight |

A composition having the above formulation was prepared by mixing and made into a sheet-shaped material. The sheet-shaped material was passed through rolls three times at 200° C. at a line pressure of 400 kg/cm to obtain a sheet material of 0.4 mm in thickness. The sheet material was measured for tensile strength, sealing property, and resistances to flons and refrigeration oils, in the same manners as in Example 1. The results are shown in Table 1.

EXAMPLE 5

| | |
|---|---|
| Polycarbodiimide resin pulp obtained in Example 1 | 15% by weight |
| Rubber (carboxy-modified SBR latex) | 15% by weight (as solid) |
| Glass fiber | 10% by weight |
| Inorganic filler | 60% by weight |

A composition having the above formulation was prepared by mixing and made into a sheet-shaped material. The sheet-shaped material was molded at 200° C. at 200 kg/cm² for 10 minutes to obtain a sheet material of 0.5 mm in thickness. The sheet material was measured for tensile strength, sealing property, and resistances to flons and refrigeration oils, in the same manners as in Example 1. The results are shown in Table 1.

EXAMPLE 6

(1) Production of polycarbodiimide resin powder 600 g of MDI (4,4'-diphenylmethane diisocyanate) and 23.8 g of phenyl isocyanate were reacted together with 1.0 g of a carbodiimidization catalyst (3-methyl-1-phenyl-2-phospholene-1-oxide) in 3,480 g of tetrachloroethylene at 120° C. for 4.5 hours. The reaction mixture was cooled to room temperature for precipitation. The resulting precipitate was collected by filtration and dried to obtain a polycarbodiimide resin powder having an average polymerization degree of n=24.

(2) Production of sheet material

| | |
|---|---|
| Above polycarbodiimide resin powder | 5% by weight |
| Rubber (carboxy-modified NBR latex) | 15% by weight (as solid) |
| Aramid pulp (fiber) | 10% by weight |
| Carbon fiber | 3% by weight |
| Inorganic filler | 67% by weight |

A composition having the above formulation was prepared by mixing and made into a sheet-shaped material. The sheet-shaped material was molded at 200° C. at 200 kg/cm² for 10 minutes to obtain a sheet material of 0.5 mm in thickness. The sheet material was measured for tensile strength, sealing property, and resistances to flons and refrigeration oils, in the same manners as in Example 1. The results are shown in Table 1.

EXAMPLE 7

(1) Production of polycarbodiimide resin powder

The same apparatus as used in Example 1 was assembled. From the material inlet of the apparatus was added 4,000 ml of tetrahydrofuran. Then, 650 g of MDI (4,4'-diphenylmethane diisocyanate) as a material was added, followed by addition of 0.2% by weight, based on MDI, of 3-methyl-1-phenyl-2-phospholene-1-oxide. A reaction was conducted under refluxing for 5 hours, followed by natural cooling, to obtain a polycarbodiimide resin solution. The NCO content in the solution was 1.7% and the average polymerization degree of the resin was n=23. The solution was dropwise added slowly to hexane of two-fold volume with stirring, to give rise to precipitation. The resulting precipitate was collected by filtration and dried to obtain a powdery polycarbodiimide resin powder containing lumps. It was ground by the use of an air classifying mill (ACM Pulverizer, a product of Hosokawa Micron Co.) to obtain an intended powdery polycarbodiimide resin.

(2) Production of sheet material

| | |
|---|---|
| Polycarbodiimide resin powder | 15% by weight |
| Rubber (carboxy-modified NBR latex) | 21% by weight (as solid) |
| Aramid pulp | 10% by weight |
| Inorganic filler | 54% by weight |

A composition having the above formulation was prepared by mixing and made into a sheet-shaped material. The sheet-shaped material was molded at 200° C. at 200 kg/cm² for 10 minutes to obtain a sheet material of 0.5 mm in thickness. The sheet material was measured for tensile strength, sealing property, and resistances to flons and refrigeration oils. The results are shown in Table 1.

EXAMPLE 8

| | |
|---|---|
| Polycarbodiimide resin pulp obtained in Example 1 | 10% by weight |
| Polycarbodiimide resin powder obtained in Example 2 | 7% by weight |
| Rubber (carboxy-modified acrylic resin emulsion) | 8% by weight (as solid) |
| Aramid pulp (fiber) | 13% by weight |
| Inorganic filler | 62% by weight |

A composition having the above formulation was prepared by mixing and made into a sheet-shaped material. The sheet-shaped material was molded at 200° C. at 200 kg/cm² for 10 minutes to obtain a sheet material of 0.5 mm in thickness. The sheet material was measured for tensile strength, sealing property, and resistances to flons and refrigeration oils, in the same manners as in Example 1. The results are shown in Table 1.

EXAMPLE 9

| | |
|---|---|
| Polycarbodiimide resin pulp obtained in Example 1 | 30% by weight |
| Rubber (carboxy-modified NBR latex) | 30% by weight (as solid) |
| Aramid pulp (fiber) | 15% by weight |
| Inorganic filler | 25% by weight |

A composition having the above formulation was prepared by mixing and made into a sheet-shaped material. The sheet-shaped material was passed through rolls twice at 220° C. at a line pressure of 300 kg/cm to obtain a sheet material of 0.8 mm in thickness. The sheet material was measured for tensile strength, sealing property, and resistances to flons and refrigeration oils, in the same manners as in Example 1. The results are shown in Table 1.

EXAMPLE 10

| | |
|---|---|
| Polycarbodiimide resin pulp obtained in Example 1 | 15% by weight |
| Polycarbodiimide resin powder obtained in Example 6 | 5% by weight |
| Rubber (carboxy-modified acrylic resin emulsion) | 10% by weight (as solid) |
| Aramid pulp (fiber) | 3% by weight |
| Carbon fiber | 3% by weight |
| Glass fiber | 2% by weight |
| Inorganic filler | 62% by weight |

A composition having the above formulation was prepared by mixing and made into a sheet-shaped material. The sheet-shaped material was passed through rolls twice at 220° C. at a line pressure of 300 kg/cm to obtain a sheet material of 0.8 mm in thickness. The sheet material was measured for tensile strength, sealing property, and resistances to flons and refrigeration oils, in the same manners as in Example 1. The results are shown in Table 1.

EXAMPLE 11

| | |
|---|---|
| Polycarbodiimide resin pulp obtained in Example 1 | 5% by weight |
| Polycarbodiimide resin powder obtained in Example 2 | 3% by weight |
| Rubber (carboxy-modified NBR latex) | 10% by weight (as solid) |
| Rubber (carboxy-modified acrylic resin emulsion) | 3% by weight (as solid) |
| Aramid pulp (fiber) | 12% by weight |
| Carbon fiber | 1% by weight |
| Inorganic filler | 66% by weight |

A composition having the above formulation was prepared by mixing and made into a sheet-shaped material. The sheet-shaped material was passed through rolls twice at 220° C. at a line pressure of 300 kg/cm to obtain a sheet material of 0.8 mm in thickness. The sheet material was measured for tensile strength, sealing property, and resistances to flons and refrigeration oils, in the same manners as in Example 1. The results are shown in Table 1.

EXAMPLE 12

| | |
|---|---|
| Polycarbodiimide resin powder obtained in Example 7 | 15% by weight |
| Rubber (carboxy-modified NBR latex) | 17% by weight (as solid) |
| Rubber (NBR latex) | 5% by weight (as solid) |
| Aramid pulp (fiber) | 10% by weight |
| Inorganic filler | 53% by weight |

A composition having the above formulation was prepared by mixing and made into a sheet-shaped material. The sheet-shaped material was molded at 220° C. at 200 kg/cm² for 7 minutes to obtain a sheet material of 0.5 mm in thickness. The sheet material was measured for tensile strength, sealing property, and resistances to flons and refrigeration oils, in the same manners as in Example 1. The results are shown in Table 1.

EXAMPLE 13

| | |
|---|---|
| Polycarbodiimide resin pulp obtained in Example 1 | 17% by weight |
| Rubber (carboxy-modified NBR latex) | 16% by weight (as solid) |
| Rubber (hydrogenated NBR latex) | 7% by weight (as solid) |
| Aramid pulp (fiber) | 11% by weight |
| Inorganic filler | 49% by weight |

A composition having the above formulation was prepared by mixing and made into a sheet-shaped material. The sheet-shaped material was passed through rolls three times at 220° C. at a line pressure of 250 kg/cm to obtain a sheet material of 0.5 mm in thickness. The sheet material was measured for tensile strength, sealing property, and resistances to flons and refrigeration oils, in the same manners as in Example 1. The results are shown in Table 1.

Comparative Example 1

| | |
|---|---|
| Polycarbodiimide resin pulp obtained in Example 1 | 15% by weight |
| Rubber (NBR latex) | 15% by weight (as solid) |
| Aramid pulp (fiber) | 5% by weight |
| Cellulose pulp (fiber) | 5% by weight |
| Inorganic filler | 60% by weight |

A composition having the above formulation was prepared by mixing and made into a sheet-shaped material. The sheet-shaped material was molded at 200° C. at 200 kg/cm² for 10 minutes to obtain a sheet material of 0.5 mm in thickness. The sheet material was measured for tensile strength, sealing property, and resistances to flons and refrigeration oils. The results are shown in Table 1

Comparative Example 2

A commercial non-asbestos joint sheet was measured for tensile strength, sealing property, and resistances to flons and refrigeration oils. The results are shown in Table 1.

Comparative Example 3

| | |
|---|---|
| Rubber (carboxy-modified SBR latex) | 15% by weight (as solid) |
| Glass fiber | 10% by weight |
| Aramid fiber | 10% by weight |
| Inorganic filler | 65% by weight |

A composition having the above formulation was prepared by mixing and made into a sheet-shaped material. The sheet-shaped material was molded at 200° C. at 200 kg/cm² for 10 minutes to obtain a sheet material of 0.5 mm in thickness. The sheet material was measured for tensile strength, sealing property, and resistances to flons and refrigeration oils, int he same manners as in Example 1. The results are shown in Table 1.

Comparative Example 4

| | |
|---|---|
| Polycarbodiimide resin pulp obtained in Example 1 | 15% by weight |
| Rubber (SBR latex) | 15% by weight (as solid) |
| Glass fiber | 10% by weight |
| Inorganic filler | 60% by weight |

A composition having the above formulation was prepared by mixing and made into a sheet-shaped material. The sheet-shaped material was molded at 200° C. at 200 kg/cm² for 10 minutes to obtain a sheet material of 0.5 mm in thickness. The sheet material was measured for tensile strength, sealing property, and resistances to flons and refrigeration oils, in the same manners as in Example 1. The results are shown in Table 1.

Comparative Example 5

| | |
|---|---|
| Rubber (carboxy-modified acrylic resin emulsion) | 15% by weight (as solid) |
| Aramid fiber | 10% by weight |
| Carbon fiber | 2% by weight |
| Inorganic filler | 73% by weight |

A composition having the above formulation was prepared by mixing and made into a sheet-shaped material. The sheet-shaped material was molded at 200° C. at 200 kg/cm² for 10 minutes to obtain a sheet material of 0.5 mm in thickness. The sheet material was measured for tensile strength, sealing property, and resistances to flons and refrigeration oils, in the same manners as in Example 1. The results are shown in Table 1.

| | Tensile strength (kg/cm²) | Sealing property (kg/cm²) | Resistance to flons (strength retention) (%) | | Resistance to refrigeration oils (strength retention) (%) | |
|---|---|---|---|---|---|---|
| | | | R12 | R134a | Mineral oil | Synthetic oil |
| Example 1 | 300 | 12 | 115 | 103 | 95 | 97 |
| Example 2 | 280 | 10 | 110 | 100 | 94 | 95 |
| Example 3 | 250 | 10 | 105 | 99 | 94 | 94 |
| Example 4 | 300 | 11 | 113 | 96 | 95 | 95 |
| Example 5 | 250 | 10 | 90 | 97 | 85 | 85 |
| Example 6 | 250 | 10 | 90 | 88 | 92 | 88 |
| Example 7 | 300 | 15 | 100 | 99 | 95 | 93 |
| Example 8 | 280 | 11 | 85 | 80 | 90 | 88 |
| Example 9 | 280 | 14 | 91 | 85 | 92 | 88 |
| Example 10 | 230 | 12 | 90 | 90 | 90 | 90 |
| Example 11 | 230 | 10 | 97 | 97 | 93 | 92 |
| Example 12 | 250 | 11 | 96 | 96 | 94 | 93 |
| Example 13 | 250 | 12 | 96 | 100 | 96 | 98 |
| Comparative Example 1 | 200 | 5 | 90 | 90 | 90 | 90 |
| Comparative Example 2 | 180 | 3 | 85 | 70 | 79 | 76 |
| Comparative Example 3 | 180 | 5 | 65 | 65 | 67 | 68 |
| Comparative Example 4 | 250 | 10 | 80 | 83 | 78 | 77 |
| Comparative Example 5 | 180 | 4 | 87 | 80 | 87 | 84 |

Industrial Applicability

In the sheet material of the present invention, the polycarbodiimide resin and the rubber (used in the form of, for example, emulsion or latex) having a functional group reactive with the carbodiimide group of said polycarbodiimide have been at least partially reacted with each other; therefore, the rubber emulsion or latex has improved water resistance and the rubber has improved heat resistance and chemical resistance; further, since the polycarbodiimide acts as a crosslinking agent for the rubber, use of a curing agent (crosslinking agent) such as sulfur or peroxide (these agents cause corrosion of metal) is not necessary. Therefore, the present sheet material exhibits excellent flexibility, sealing property, strength, chemical resistance and heat resistance and can be used as a gasket having excellent resistances particularly to fluorocarbon refrigerants as well as to oils used in the apparatuses using said refrigerants.

We claim:

1. A sheet material consisting essentially of 30–90% by weight of an inorganic filler other than asbestos, 1–50% by weight of a polycarbodiimide resin, 5–50% by weight of a rubber having a functional group reactive with the carbodiimide group and 0–50% by weight of an organic or inorganic fiber, wherein said polycarbodiimide and said rubber have been at least partially reacted with each other.

2. A sheet material according to claim 1, further consisting essentially of 0–30% by weight of a rubber having no functional group reactive with a carbodiimide group.

3. A sheet material according to claim 1, wherein the polycarbodiimide resin is obtained by polymerizing, in the presence of a carbodiimidization catalyst, an organic diisocyanate represented by formula (1)

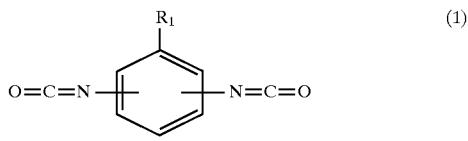

(wherein $R_1$ represents a hydrogen atom, a lower alkyl group or a lower alkoxy group corresponding to said lower alkyl group), or formula (2)

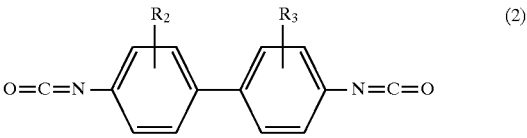

(wherein $R_2$ and $R_3$ each represent a hydrogen atom, a lower alkyl group or a lower alkoxy group corresponding to said lower alkyl group), or formula (3)

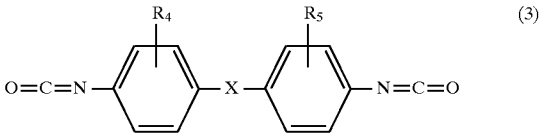

(wherein $R_4$ and $R_5$ each represent a hydrogen atom, a lower alkyl group or a lower alkoxy group corresponding to said lower alkyl group; and X represents an oxygen atom or a methylene group).

4. A sheet material according to claim 1, wherein the polycarbodiimide resin is powdery.

5. A sheet material according to claim 1, wherein the polycarbodiimide resin is in the form of a pulp.

6. A sheet material according to claim 1, wherein the functional group of the rubber having a functional group reactive with a carbodiimide group is a carboxyl group, a phenolic hydroxyl group, an alcoholic hydroxyl group, an amino group, an epoxy group, a thiol group or a carboxylic acid anhydride group.

7. A sheet material according to claim 1, wherein the fiber is a polyamide fiber, an aramid fiber, a carbon fiber, a polyester fiber, a polyacrylonitrile fiber, a cellulose fiber, a glass fiber, a rock wool or a ceramic fiber.

8. A process for producing a sheet material, which comprises making into a sheet-shaped material a composition consisting essentially of 30–90% by weight of an inorganic filler other than asbestos, 1–50% by weight of a polycarbodiimide resin, 5–50% by weight of a rubber having a functional group reactive with a carbodiimide group and 0–50% by weight of an organic or inorganic fiber, and then heating the sheet-shaped material at a temperature not lower than the softening point of said polycarbodiimide resin to cause at least a partial reaction between said polycarbodiimide and said rubber.

9. A process according to claim 8, wherein the composition further consists essentially of 0–30% by weight of a rubber having no functional group reactive with a carbodiimide group.

10. A process according to claim 8, wherein the polycarbodiimide resin is obtained by polymerizing, in the presence of a carbodiimidization catalyst, an organic diisocyanate represented by formula (1)

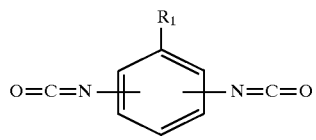
(1)

(wherein $R_1$ represents a hydrogen atom, a lower alkyl group or a lower alkoxy group corresponding to said lower alkyl group), or formula (2)

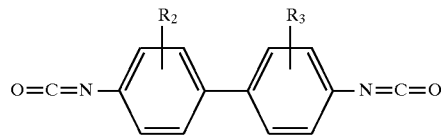
(2)

(wherein $R_2$ and $R_3$ each represent a hydrogen atom, a lower alkyl group or a lower alkoxy group corresponding to said lower alkyl group), or formula (3)

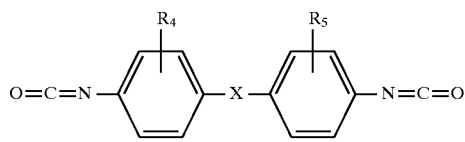
(3)

(wherein $R_4$ and $R_5$ each represent a hydrogen atom, a lower alkyl group or a lower alkoxy group corresponding to said lower alkyl group; and X represents an oxygen atom or a methylene group).

11. A process according to claim 8, wherein the polycarbodiimide resin is powdery.

12. A process according to claim 8, wherein the polycarbodiimide resin is in the form of a pulp.

13. A process according to claim 8, wherein the rubber having a functional group reactive with a carbodiimide group is a rubber latex or a rubber emulsion.

14. A process according to claim 8, wherein the functional group of the rubber having a functional group reactive with a carbodiimide group is a carboxyl group, a phenolic hydroxyl group, an alcoholic hydroxyl group, an amino group, an epoxy group, a thiol group or a carboxylic acid anhydride group.

15. A process according to claim 8, wherein the fiber is a polyamide fiber, an aramid fiber, a carbon fiber, a polyester fiber, a polyacrylonitrile fiber, a cellulose fiber, a glass fiber, a rock wool or a ceramic fiber.

* * * * *